Sept. 11, 1934.  H. P. CHANDLER  1,972,979
MOTOR STARTER
Filed Oct. 19, 1932  3 Sheets-Sheet 2
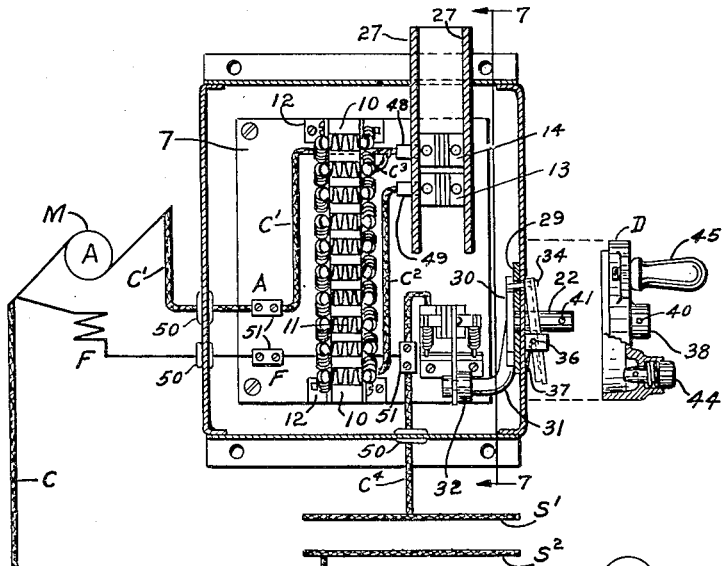
FIG. 6
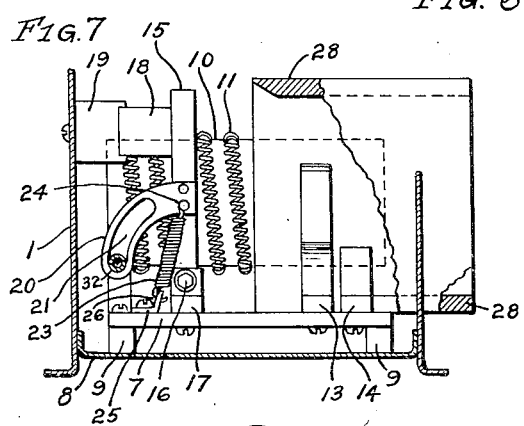
FIG. 7
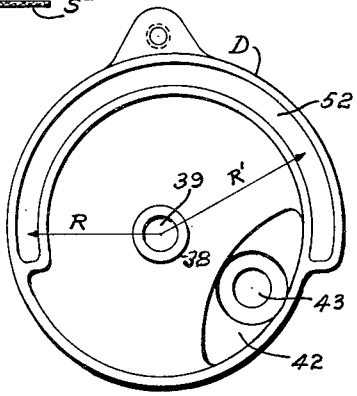
FIG. 9
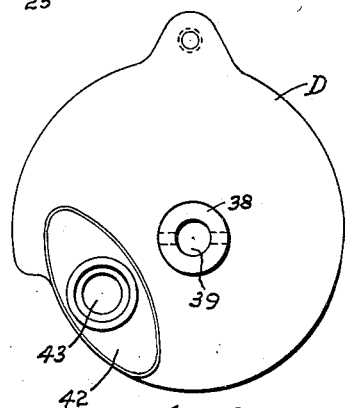
FIG. 8
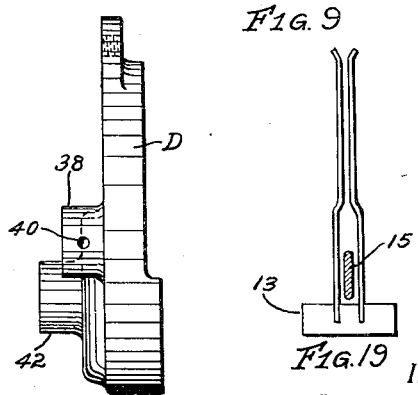
FIG. 10  FIG. 19
Inventor
HOMER P. CHANDLER
By 
Attorney Sept. 11, 1934.   H. P. CHANDLER   1,972,979
MOTOR STARTER
Filed Oct. 19, 1932   3 Sheets-Sheet 3

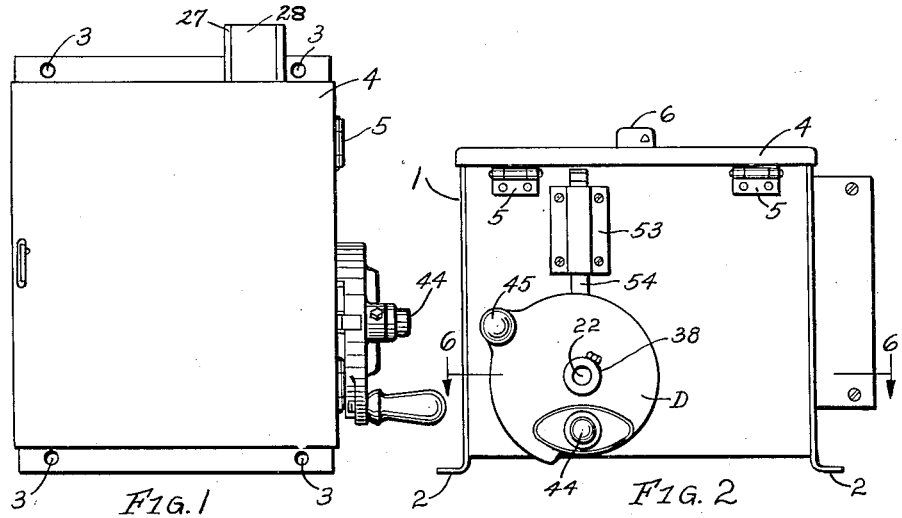
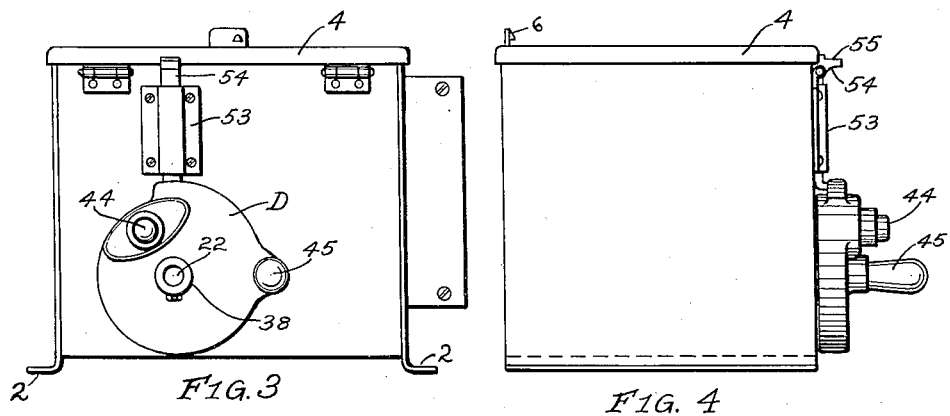
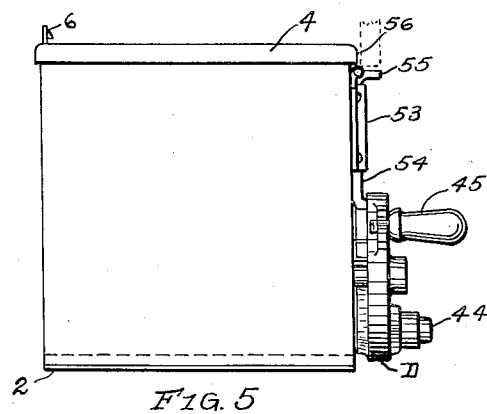

Inventor
HOMER P. CHANDLER
By
Attorney

Patented Sept. 11, 1934

1,972,979

UNITED STATES PATENT OFFICE 1,972,979

MOTOR STARTER

Homer P. Chandler, Mansfield, Ohio, assignor to The Ohio Brass Company, Mansfield, Ohio, a corporation of New Jersey Application October 19, 1932, Serial No. 638,562

9 Claims. (Cl. 200—50)

My invention relates to motor starters of the hand operated type.

Among the objects of my invention is provided a device which will, upon closing the circuit to the motor, throw in connection therewith a resistance to limit the initial flow of current to the motor.

Another object is to prevent an operator from making a single continuous movement of the starter blade from the open position to the final closing of the circuit and to cause the operator to pause in moving the blade operating mechanism from what may be termed the initially closed position when the resistance is in series circuit to the finally closed or running position.

Another object is to cut out the starting resistance when the device is in its running position.

A further object of my invention is to auto20 matically lock the cover closed or resist the opening of the cover when the switch is in its running position.

Another object of my invention is to automatically close the cover should it be open at the time of closing the switch.

My invention resides in the new and novel construction, combination and relation of the various parts herein described and shown in the drawings accompanying this specification.

In the drawings:—

Fig. 1 represents a top plan view of my invention.

Fig. 2 represent a side elevation showing the relation of the external parts when the switch is open.

Fig. 3 is the same view as Fig. 2 with the external operating parts in finally closed position of the switch.

Fig. 4 is another side view of my invention to that shown in Fig. 3 and showing the manner in which the cover is held closed.

Fig. 5 is a side view of my invention corresponding to that shown in Fig. 5 with the cover released so that it may be opened.

Fig. 6 is a top view in partial section of my invention with the cover removed and looking into the interior thereof and the switch shown in its open position and with the upper portion of the arc chute removed.

Fig. 7 is a partial section on the line 7—7 of Fig. 6 to show in elevation the interior mechanism of the switch.

Figs. 8, 9 and 10 are front, back and edge views respectively of an external operating part of the mechanism later described.

Figure 11:
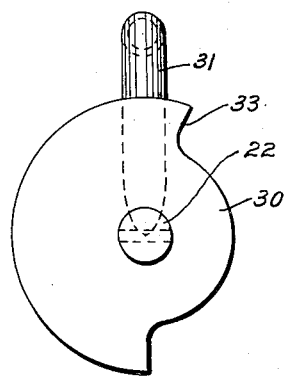
Figure 12:
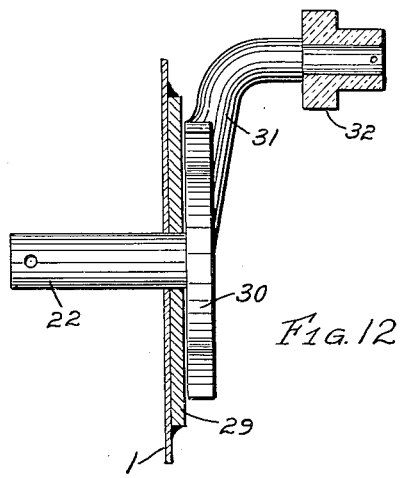
Figure 13:
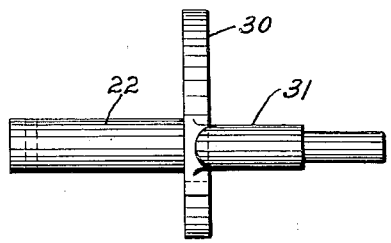

Figs. 11, 12 and 13 are face and two edge views respectively of an interior part of the operating mechanism later described.

Figure 16:
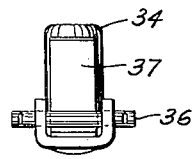
Figure 14:
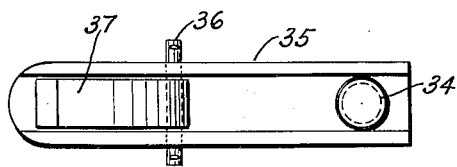
Figure 15:
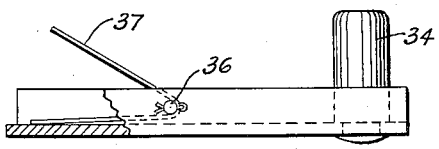

Figs. 14, 15 and 16 are side, edge and end views respectively of a second external part of the operating mechanism later described.

Figure 17:
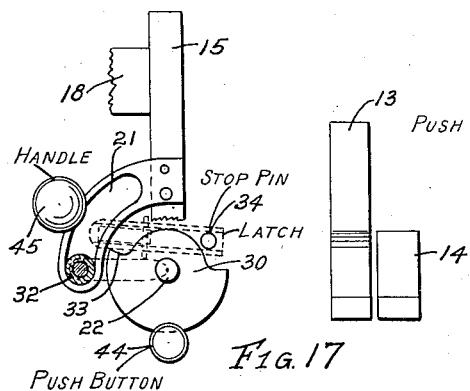

Fig. 17 is a schematic view showing the relation of the operating parts of the mechanism when the switch is in the open position.

Figure 18:
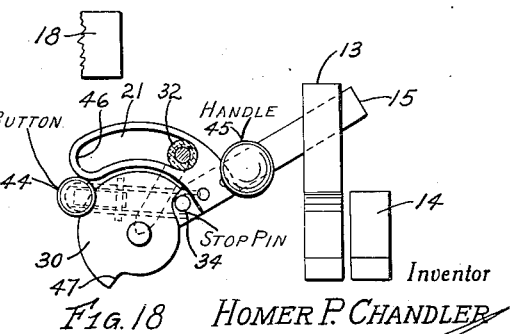

Fig. 18 is a schematic drawing showing the relation of the same parts as shown in Fig. 17 when the switch is in an intermediate position between the open and running positions and at which time the operator is limited by the mechanism to further movement of the switch to the running position until he has made certain operations later described.

Fig. 19 shows an edge view of one form of clip I may use and the relation of the blade thereto when the switch is in the running position.

In the preferred embodiment of my invention I employ a container or receptacle 1 for the switch proper having feet 2 by means of which the switch may be secured to the support by means of screws passing through the holes 3.

The switch box is provided with a cover 4 hinged at the points 5. The box is provided with a manually movable spring latch 6 to hold the cover in its closed position when the switch is open and to assist in holding it closed when the switch is in the running position.

Positioned within the receptacle is a switch and resistance mounted upon an insulating base 7 which in turn is mounted upon the bottom portion 8 of the box by means of the members 9. Mounted upon a support 10 of insulating material, preferably fireproof such as porcelain, stone ware, etc., is a resistance element or resistor 11 of helically coiled resistance wire, such as nichrome, in turn wound upon the element 10. The support 10 is secured to the base 7 by means of clips 12.

Also mounted upon the base 7 of insulating material are spaced switch clips 13 and 14. The clips are insulated from each other and the clip 13 is first engaged by the switch blade 15 and the blade later engages with the clip 14.

The blade 15 is pivotally mounted at 16 to the base 7 by the clip 17. The rearward movement of the blade 15 is limited by a stop 18, preferably of resilient rubber, secured to an insulating block 19 which in turn is secured to the box 1.

The switch blade has secured thereto a projecting member 20 having an arcuate slot 21 therein, the center of radius of which is the axis of the stud 22. Springs 23 are secured to the blade by means of studs 24 and to the base 7 by means of a clip 25.

The springs 23 are arranged to hold the switch in its open position and to move the switch from its closed to its open position with a quick break action and the attaching points of the spring with respect to the pivot 16 are such that when the switch is in its closed position these three points are either in a straight line or the point 26 will be slightly below the line connecting the points 16 and 24 when the switch is closed thus constituting an overcenter spring having a tendency to hold the switch closed with a slight tension.

The clips 13 and 14 are enclosed in an arc chute comprising insulating side pieces 27 and upper and lower insulating pieces 28. The arc chute is open at both ends.

As the box 1 is constructed of a very light gauge steel I reinforce one side wall by means of a plate 29 secured by riveting, welding, etc. There is an opening provided through the plate 29 and its side wall to receive the stud 22 integrally formed with the disc 30 and the disc 30 is provided with an integrally projecting arm 31 having insulating spool 32 on the end which engages with the member 20 in the slot 21 such that when the shaft 22 is rotated in one direction the arm 31 and spool 32 will move within the slot 21 until it engages the member 20 at the opposite end of the slot than that shown in Fig. 7 and further rotative movement of the stud 22 will cause the blade 15 to be moved upon its pivot 16 and finally into engagement with the clip 14. In Figs. 11, 12 and 13 are enlarged views of the member just described. In Fig. 12 a portion of the box wall 1 and the mounting of the operating member thereto is shown.

The member 30 is provided with a stop face 33 which engages with a stop pin 34. The pin 34 is secured to a member 35 which is pivotally mounted upon the box 1 at 36, and is normally held in the position shown in Fig. 6 by means of a spring 37. The stop pin 34 passes through an opening in the members 1 and 29 and is engageable by the stop face 33 on the disc 30 when the operating mechanism has moved the switch blade to the intermediate closed position shown in Fig. 18.

Mounted upon the stud 22 is an operating disc D shown in Figs. 8, 9 and 10 and is shown removed in axial relation to the stud 22 in Fig. 6.

The operating disc is provided with a hub 38 having an opening 39 therethrough to receive the stud 22 and locked in position thereon by means of a pin inserted through registering holes 40 and 41. The inner face of the disc when in position is adjacent to the wall of the box and encloses the latch and stop pin 34.

The disc is provided with a box 42 with a passage 43 therethrough and located in the passage 43 is a spring-held push button 44 (see Fig. 6). The disc is also provided with a manually operated handle 45 by means of which the disc may be rotated and simultaneously therewith the shaft 22.

In Fig. 17 is shown the relative location of the various important elements for operating the switch when looking toward the device as in Fig. 2.

The operation of closing the switch is as follows:—

The handle 45 is grasped by the operator who rotates the same in a clockwise direction thus rotating the stud 22 and the disc 30 connected thereto. This rotation brings the insulating spool 32 at the opposite end of the slot from that shown in Fig. 17 without operating the blade 15. Further rotation of the handle 45 will rotate the blade 15 in a clockwise direction and until the stop face 33 engages with the stop pin 34 as shown in Fig. 18. In this position the blade 15 has contacted with the clip 13 thus making the initial closing of the switch and throwing the resistance 11 in circuit with the motor. In order to finally close the switch or bring it to its running position and thus cut out the resistance, it is necessary to disengage the stop shoulder 33 from the stop pin 34 and this is brought about by the operator pressing the button 44 with one hand while he holds the switch in the partially closed position with the other hand.

In rotating the handle the push button 44 is moved from the position shown in Fig. 17 to that shown in Fig. 18 and its inner end is adjacent the latch 35 and inward pressure upon the button 44 will pivot the latch and disengage the stop pin from the stop shoulder 33 thus permitting the operator to continue rotation clockwise of the handle 45 until the blade 15 is in contact with the clip 14 thus placing the switch in the running position and cutting out the resistance 11.

As soon as the stop pin 34 is released from the shoulder 33 and the handle moves slightly, the end of the pin will ride upon the face of the disc 30 and may be released by the operator without causing further effect. The switch blade is held in the closed position either through the spring-terminals and switch pivot being in alignment or the spring slightly over center as previously described.

To open the switch it is only necessary for the operator to move the handle 45 in an anti-clockwise direction and when the insulating spool 32 engages the end 46 of the slot 21 further rotation in an anti-clockwise direction will move the blade 15 until the springs 23 function to cause the blade 15 to release the contacts 13 and 14 with a quick break action and thus restoring the switch to its normal or open position.

The shoulder 47 has no function.

In use the switch is connected between the motor M and the source of supply S1 and S2. This is brought about by connecting one terminal of the armature A to the main S2 by means of the conductor C and the other terminal of the armature A to the terminal 48 by means of the conductor C1. The terminal 49 is connected to one end of the resistance coil 11 by means of the conductor C2 and the other end of the resistance coil is connected to the terminal 48 by the conductor C3 in such a manner that either the coil 11 is short-circuited when the switch is closed or is entirely cut out.

The switch blade terminal 17 is connected to the main S1 by means of the conductor C4. The field F is connected between the terminal 17 and the armature terminal connected to the conductor C. The conductors may enter the box through the insulated bushings 50 and be connected to terminals 51.

Referring to Fig. 9 an arcuate slot 52 is provided on the inner face of the disc and the radius of the slot with respect to the axis of the opening 39 increases from R to R', in other words, the slot 52 acts as a cam and by means of which the operation of the cover 4 is controlled.

Slidably mounted in a strap 53 is a bolt 54 having its lower end turned outwardly to cooperate with the slot 52 and its upper end also turned outwardly to form the lip 55, as shown in Fig. 5.

When the handle 45 has been moved to its extreme anti-clockwise position, the bolt will be in the position shown in Fig. 5 and it will be apparent that the cover 4 may be opened and that its edge 56 will rest upon the lip 55. If now the handle 45 is moved in a clockwise direction the projection at the lower end of the bolt 54 will be raised due to the change in radius of the slot 52 and this will cause the cover 4 to be moved toward its closed position and until the cover is finally closed the operation of the handle 45 in the clockwise direction is resisted.

When the cover is closed, as in Fig. 4, the bolt 54 will finally reach the position shown in Fig. 4 when the handle has been rotated to its extreme clockwise position. It will thus be seen from Fig. 4 that the bolt 54 will prevent or strongly resist the opening of the cover without damage thereto.

It will be evident that I have provided a switch which will prevent the operator from practically throwing the motor directly across the mains at the time of starting and that he is compelled to hesitate in the switch closing operation long enough to press the button 44 to release the mechanism before the closing operation can be completed. Should the operator attempt to hold the button 44 inwardly with one hand while operating the handle 45 with the other, he will find that the inner end of the button 44 will engage with the lower face of the latch 35 thus preventing further rotation of the handle until he has released the button 44 in which case he can then continue the rotation of the handle 45 until the stop pin 34 is engaged by the stop shoulder 33, thus it will be seen that nothing will be gained by the operator attempting to avoid a non-continuous movement of the handle from the open to the finally closed position.

The hesitation in movement of the blade in contact with clip 13 will be sufficient to permit the motor to gain considerable speed before the switch is finally closed and the resistor cut out.

Modifications will suggest themselves to those skilled in the art, therefore, I wish to be limited only by my claims.

I claim:—

1. A control mechanism for a motor starting switch and for the door of the receptacle within which switch is mounted comprising an operating mechanism positioned on the outside of the receptacle to rotate operating mechanism positioned within the receptacle and connected by a shaft extending through a wall of the receptacle, the outer operating mechanism comprising in part a member secured to the shaft to rotate therewith, a handle to manually operate the mechanism, a spring held stop pivotally mounted on the wall of the receptacle and having a pin projecting through an orifice in the said wall and operable to retract said projecting pin, the inner operating mechanism comprising in part a member to which said shaft is secured to operate with the member without the receptacle and having a stop part to engage the projecting pin after the operating mechanisms have rotated a predetermined amount and the switch is in the starting position, a spring held push button mounted on the outer operating mechanism to engage the spring held stop to retract the pin at will of the operator and permit the mechanism to be further rotated, means secured to the inner operating mechanism and cooperating with the switch to move the switch to the starting and to the running positions, a cam surface on the outer operating mechanism and a slidably mounted member provided with means in operative relation to the cam surface and moved thereby to engage the cover without the receptacle and close the cover as the switch moves towards the starting position and to hold the cover closed when the switch and operating mechanisms are in the switch running position, slidably mounted member movable at right angles to the axis of the shaft.

2. A controller for a motor starting switch movably mounted within a receptacle and movable to starting and running positions of operaing mechanism for the switch mounted on one wall of the receptacle and comprising a member on the outside of the receptacle and another member on the inside of the receptacle and connected by a shaft extending through the wall for simultaneous rotation of the said members, means on the outer member for manual rotation of the members, a pin projecting through the wall and concealed by the outer member, spring held means pivotally mounted on the wall between the wall and outer member to yieldingly hold the pin projected within the receptacle, means on the inner operating member to move the switch to its starting and its running positions, means on the inner member to engage the pin when the operating member has moved the switch to the starting position to check the advance of the switch, and manually operated means on the outer member to retract the pin away from the path of the inner member to permit the operator to continue the movement of the switch to the running position.

3. A controller for a motor starting switch movably mounted within a receptacle and movable to starting and running positions of, operating mechanism for the switch mounted on one wall of the receptacle and comprising a member on the outside of the receptacle and another member on the inside of the receptacle and connected by a shaft extending through the wall for simultaneous rotation of the said members, means on the outer member for manual rotation of the members, a pin projecting through the wall and concealed by the outer member, spring held means pivotally mounted on the wall between the wall and outer member and concealed by the outer member to yieldingly hold the pin projected within the receptacle, means on the inner operating member to cooperate with slotted means on the switch after the operating mechanism has rotated a predetermined amount to move the switch to the starting position, means on the inner member to engage the pin when the operating member has moved the switch to the starting position to check the advance of the switch and manually operated means on the outer member to retract the pin away from the path of the inner member to permit the operator to continue the movement of the switch to the running position.

4. A controller for a motor starting switch movably mounted within a receptacle and movable to starting and running positions of operating mechanism for the switch mounted on one wall of the receptacle and comprising a rotatable member on the outside of the receptacle and another rotatable member on the inside of the receptacle and connected by a shaft extending through the wall for simultaneous rotation of the said members, means on the outer member for manual rotation of the members, a pin projecting through the wall and concealed by the outer member, spring held means pivotally mounted on the outer face of the wall of the receptacle and concealed by the outer member to yieldingly hold the pin projected within the receptacle, means on the inner operating member to cooperate with a slotted member on the switch after the operating mechanism has rotated a predetermined amount to move the switch to the starting position, means on the inner member to engage the pin when the operating member has moved the switch to the starting position to check the advance of the switch, and manually operated means on the outer member to engage the said spring-held means to retract the pin away from the path of the inner member to permit the operator to continue the movement of the switch to the running position.

5. A control mechanism for a starting switch mounted in a receptacle and movable to open, starting and running positions comprising a member within the receptacle and a member without the receptacle connected by a shaft extending through a wall of the receptacle and to rotate in unison, a manually operable handle on the outer member to rotate the same and a concealed member projecting through the wall to be engaged by the inner member to check its rotation after it has been rotated a predetermined amount, means on the outer member spaced from the handle to retract said projecting means from the path of the inner member, means on the inner member to coact with the switch in insulated relation thereto to move the switch first to its starting and then to its running position after the projecting member has been retracted and the operating members rotated.

6. A control mechanism for a starting switch mounted in a receptacle having a cover and movable to open, starting and running positions comprising a member within the receptacle and a member without the receptacle connected by a shaft extending through a wall of the receptacle and to rotate in unison, a manually operable handle on the outer member to rotate the same and a concealed member projecting through the wall to be engaged by the inner member to check its rotation after it has been rotated a predetermined amount, means on the outer member spaced from the handle to retract said projecting means from the path of the inner member, means on the inner member to coact with the switch in insulated relation thereto to move the switch first to its starting and then to its running position after the projecting member has been retracted and the operating members rotated, a cam surface on one of the operating members and a member cooperating with the cam surface and with the cover and moved at right angles to the shaft axis by the cam when the outer member is rotated to hold the cover closed while the switch is in its running position.

7. Control means for a pivotally mounted quick break switch having starting and running positions and mounted in a receptacle, of an operating mechanism mounted partly within and partly without the receptacle and connected by a shaft for simultaneous operation, manual operating means on the outer operating mechanism, concealed stop means pivotally mounted on the receptacle wall between the inner and outer operating mechanisms and engageable by the inner mechanism to check the rotation of the operating mechanism when the switch has been moved to its starting position, manually operable means associated with the outer operating mechanism to engage the stop means and release the check at will, slotted means on the switch, means on the inner operating mechanism movable in the slot of the slotted member and to engage the end walls of the slot to move the switch from its running position when the operating mechanism is rotated in the switch opening direction, the slot providing for lost motion between the switch and operating mechanism during the opening of the switch.

8. A control mechanism for operating a switch and maintaining the cover of the receptacle in which the switch is mounted closed while the switch is energized, comprising in combination a shaft arranged to extend through one wall of the receptacle, a member secured to the shaft within the receptacle and having projecting means to coact with the switch to operate it to its various positions, a member secured to the shaft without the receptacle, a stop device pivotally mounted on the outer face of the receptacle and concealed by the outer member and having stop means projecting through an orifice in the wall of the receptacle, means yieldingly holding the stop means projected through the wall, means on the inner member to engage the stop means after the members have rotated a predetermined amount to check movement of the members in one direction, means on the outer member to manually rotate the members and other means on the outer member to manually release the stop means at will of the operator to permit further movement of the members, means without the receptacle movable at right angles to the axis of the shaft to engage the cover on the receptacle to hold it closed while the switch is energized and cam means on the outer member cooperating with means on the said cover holding means to move the same at right angles to the shaft axis as the members rotate.

9. Mechanism to close and maintain closed the cover on a switch receptacle so that the cover may not be opened while the switch is closed comprising a shaft mounted on a wall of the receptacle and projecting through an opening in the wall, means secured to the inner end of the shaft to maintain the alignment of the shaft with the face of the wall, a member secured to the outer end of the shaft, a groove in the inner face of the member and having a cam face, an elongated member movable at right angles to the axis of the shaft and having means coacting with the cam face of the groove to move the member when the cam face moves relative to the member, means on the elongated member to engage the cover if open and to close the same when the member is moved in one direction and to maintain the cover closed when the switch swithin the receptacle is closed and a manually operated handle on the first member to operate the member and move the cam relative to the elongated member.

HOMER P. CHANDLER.